United States Patent
Tanabe

(10) Patent No.: US 11,072,107 B2
(45) Date of Patent: Jul. 27, 2021

(54) METHOD FOR PROVIDING SEMI-WORKED PRODUCT AND MANDREL COVERED WITH LONG BODY

(71) Applicant: JUNKOSHA INC., Ibaraki (JP)

(72) Inventor: Suguru Tanabe, Ibaraki (JP)

(73) Assignee: JUNKOSHA INC., Ibaraki (JP)

( * ) Notice: Subject to any disclaimer, the term of this patent is extended or adjusted under 35 U.S.C. 154(b) by 0 days.

(21) Appl. No.: 16/924,832

(22) Filed: Jul. 9, 2020

(65) Prior Publication Data

US 2020/0338805 A1 Oct. 29, 2020

Related U.S. Application Data

(63) Continuation of application No. PCT/JP2020/015405, filed on Apr. 3, 2020.

(30) Foreign Application Priority Data

Apr. 5, 2019 (JP) .............................. JP2019-073207
Apr. 13, 2019 (JP) .............................. JP2019-076717

(Continued)

(51) Int. Cl.
*B29C 53/60* (2006.01)
*B29C 53/58* (2006.01)
(Continued)

(52) U.S. Cl.
CPC ............ *B29C 53/60* (2013.01); *B29C 53/583* (2013.01); *B29K 2027/18* (2013.01); *B29L 2023/005* (2013.01); *B29L 2031/7542* (2013.01)

(58) Field of Classification Search
CPC .................. B29C 53/60; B29C 53/583; B29L 2031/7542; B29L 2023/005; B29K 2027/18
See application file for complete search history.

(56) References Cited

U.S. PATENT DOCUMENTS 3,756,004 A * 9/1973 Gore ................... H01B 13/0003
242/441.2
3,887,761 A * 6/1975 Gore ..................... H01B 13/085
174/110 R
(Continued)

FOREIGN PATENT DOCUMENTS

EP 1640818 A1 3/2006
EP 1887439 A1 2/2008
(Continued)

OTHER PUBLICATIONS

Jun. 23, 2020, International Search Report issued for related PCT application No. PCT/JP2020/015405.
(Continued)

*Primary Examiner* — Jeffry H Aftergut
(74) *Attorney, Agent, or Firm* — Paratus Law Group, PLLC

(57) ABSTRACT

The present invention relates to a method for providing a semi-worked product and a mandrel covered with a long body which is the semi-worked product, in which the semi-worked product is a long body which is formed without a gap by spirally winding at least one sheet of film, at least one sheet of film of the at least one sheet of film is made of at least polytetrafluoroethylene, the long body has a thickness of 5 µm or more and 75 µm or less, and the long body is provided in a state of being in contact with a mandrel.

8 Claims, 3 Drawing Sheets

(30) Foreign Application Priority Data

| Apr. 17, 2019 | (JP) | JP2019-078892 |
| Apr. 25, 2019 | (JP) | JP2019-084635 |
| Sep. 24, 2019 | (JP) | JP2019-173380 |
| Apr. 2, 2020 | (JP) | JP2020-067081 |

(51) Int. Cl.
- *B29L 31/00* (2006.01)
- *B29L 23/00* (2006.01)
- *B29K 27/18* (2006.01)

(56) References Cited

U.S. PATENT DOCUMENTS

| 5,718,973 | A | * | 2/1998 | Lewis | A61F 2/82 |
| | | | | | 428/35.7 |
| 5,752,934 | A | * | 5/1998 | Campbell | A61L 29/085 |
| | | | | | 604/96.01 |
| 5,972,441 | A | * | 10/1999 | Campbell | A61L 29/041 |
| | | | | | 428/34.1 |
| 2003/0082323 | A1 | | 5/2003 | Venditti et al. | |
| 2004/0157024 | A1 | | 8/2004 | Colone | |
| 2011/0180955 | A1 | | 7/2011 | Inamoto et al. | |
| 2017/0304505 | A1 | | 10/2017 | Ohshika et al. | |

FOREIGN PATENT DOCUMENTS

| JP | H04-064791 A | 2/1992 |
| JP | H05-338062 A | 12/1993 |
| JP | H06-074148 U | 10/1994 |
| JP | H09-501759 A | 2/1997 |
| JP | 2000-316977 A | 11/2000 |
| JP | 2010-155361 A | 7/2010 |
| WO | WO 2012/167031 A1 | 12/2012 |

OTHER PUBLICATIONS

Jun. 23, 2020, International Search Opinion issued for related PCT application No. PCT/JP2020/015405.

Apr. 14, 2021, European Search Report issued for related EP application No. 20735262.6.

* cited by examiner

METHOD FOR PROVIDING SEMI-WORKED PRODUCT AND MANDREL COVERED WITH LONG BODY

This is a continuation of International Application No. PCT/JP2020/015405 filed on Apr. 3, 2020, and claims priority from Japanese Patent Application (JP2019-073207) filed on Apr. 5, 2019, Japanese Patent Application (JP2019-076717) filed on Apr. 13, 2019, Japanese Patent Application (JP2019-078892) filed on Apr. 17, 2019, Japanese Patent Application (JP2019-084635) filed on Apr. 25, 2019, Japanese Patent Application (JP2019-173380) filed on Sep. 24, 2019, and Japanese Patent Application (JP2020-067081) filed on Apr. 2, 2020, the disclosures of which are incorporated herein by reference.

TECHNICAL FIELD

The present invention relates to a method for providing a semi-worked product made of polytetrafluoroethylene (hereinafter referred to as "PTFE") and a mandrel covered with a long body which is the semi-worked product.

BACKGROUND ART

There are products in which a fluororesin layer is provided on the inner layer of a pipe, such as a fluid transportation pipe which is for medical applications and which requires chemical resistance. These products include a product produced by using a long body made of a fluororesin, which is provided as a semi-worked product, and laminating various resins and outer layer materials such as a reinforcing layer on the long body.

For example, when the long body made of a fluororesin is used for a catheter, there is a product in which an elastomer layer for imparting straightness and operability and a reinforcing layer including a metal wire are sequentially laminated on the outer periphery of the long body. In addition, for pharmaceutical application, there is a product in which a silicone elastomer is laminated on the long body made of a fluororesin, and an elastomer layer embedded with a braid of polyester fibers is laminated on the silicone elastomer. Further, when used for fuel transportation, there is a product in which an elastomer is laminated on the outer periphery of the long body, and a braid of reinforcing materials having high heat resistance is added on the outer periphery.

A finished product using the semi-worked product may be required to be thin, and in this case, the semi-worked product forming a part of the finished product is also required to be thin. In addition, when the product is required to have softness and flexibility, it is sometimes necessary to make the semi-worked product thin because the fluororesin is hard.

SUMMARY OF INVENTION

Problems to be Solved by Invention

In the conventional art, for example, when a manufacturer uses the long body provided as a semi-worked product, a product is produced by: a step of inserting a mandrel inside the long body; a step of heating the mandrel and stretching the long body in a longitudinal direction to bring the mandrel into uniform contact with the long body; a step of forming a product by laminating various layers on the long body in a state where the long body is in contact with the surface of the mandrel; and a step of pulling the mandrel out of the product by stretching the mandrel in the longitudinal direction to reduce the diameter. As described above, in the long body which is the semi-worked product in the conventional art, the step of bringing the semi-worked product into contact with the mandrel is required in the process of producing the product.

Means for Solving the Problem

The problem of the present invention can be solved by a method for producing a semi-worked product, wherein the semi-worked product is a long body which is formed without a gap by spirally winding at least one sheet of film, at least one sheet of film of the at least one sheet of film is made of at least polytetrafluoroethylene, the long body has an average thickness of 5 μm or more and 75 μm or less, and the long body is provided in a state of being in contact with a mandrel.

In addition, the problem of the present invention can be solved by a mandrel covered with a long body including: a mandrel; and a long body which is formed without a gap by spirally winding at least one sheet of film around an outer periphery of the mandrel, wherein at least one sheet of film of the at least one sheet of film is made of at least polytetrafluoroethylene, and the long body has an average thickness of 5 μm or more and 75 μm or less.

For the long body, in a stress-strain curve of the long body where a measured value obtained by a tensile test according to JIS K7127-1999 is used, and a strain % is taken as a horizontal axis and a stress $N/mm^2$ is taken as a vertical axis, when the stress-strain curve is regarded as a single peak, a full width at half maximum of the peak is preferably in a range of 10% or more and 150% or less.

For the long body, a tensile strength at 20% displacement of the long body obtained by the tensile test according to JIS K7127-1999 is preferably 100 N/mm or more.

In the long body, it is preferable that one or more sheets of the films are spirally wound in a right-handed manner, and one or more sheets of the films are spirally wound in a left-handed manner.

The film preferably has a thickness of 2 μm or more and 25 μm or less. The film may be a film formed by laminating at least a polytetrafluoroethylene film and a thermoplastic fluororesin film.

The long body provided as the semi-worked product is more preferably provided in a state of being in contact with a mandrel having an outer diameter of 0.05 mm or more and 10 mm or less.

Further, the above problem can be solved by a method for providing a semi-worked product, wherein the semi-worked product is a cylindrical long body made of at least polytetrafluoroethylene, the long body has an average thickness of 5 μm or more and 75 μm or less, in a stress-strain curve of the long body where a measured value obtained by a tensile test according to JIS K7127-1999 is used, and a strain % is taken as a horizontal axis and a stress $N/mm^2$ is taken as a vertical axis, when the stress-strain curve is regarded as a single peak, a full width at half maximum of the peak is in a range of 10% or more and 150% or less, and the long body is provided in a state of being in contact with a mandrel.

Advantageous Effects of Invention

According to the present invention, the above problems are solved by the unprecedented method for providing a semi-worked product. That is, the step of bringing the long body provided as the semi-worked product into contact with the mandrel is unnecessary, and the production time in the production process can be greatly reduced.

DESCRIPTION OF EMBODIMENTS

Hereinafter, embodiments of the present invention will be described in detail. The embodiments described hereinafter do not limit the invention according to the claims, and the features described in the embodiments are not necessarily essential to the establishment of the present invention.

Figure 1:
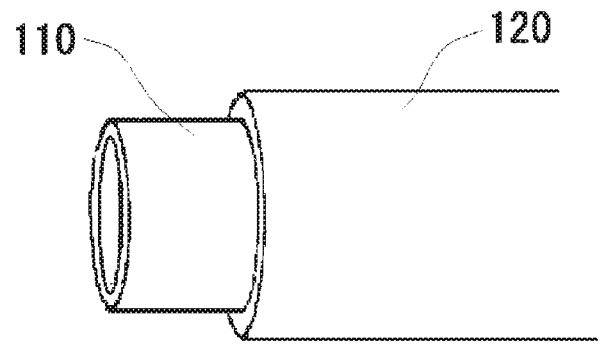
FIG. 1 is a diagram showing an embodiment in which a semi-worked product of the present invention is provided.

FIG. 1 is a diagram showing an embodiment in which a semi-worked product of the present invention is provided. A long body as the semi-worked product of the present invention is provided to the manufacturer in a state where an inner peripheral surface of a long body 120 is in contact with an outer periphery of a mandrel 110. The long body 120 is in a cylindrical form made of a resin containing polytetrafluoroethylene, and the average thickness of the long body 120 is generally required to be thin. The thickness of the long body of the present invention is preferably 5 µm or more and 75 µm or less, more preferably 5 µm or more and 50 µm or less, and still more preferably 5 µm or more and 40 µm or less. In addition, it is preferable that the long body 120 has at least one sheet of film spirally wound around the mandrel 110, and is formed by the at least one sheet of film without a gap. Here, the phrase "formed without a gap" means that the outer peripheral surface of the mandrel 110 is in a state of being completely covered with one or more sheets of films.

As other modes of forming the long body 120 on the mandrel 110 without a gap, the long body 120 can be formed without a gap by using a so-called cigarette winding of film, and also can be formed without a gap by using one sheet of seamless film.

Figure 2A:
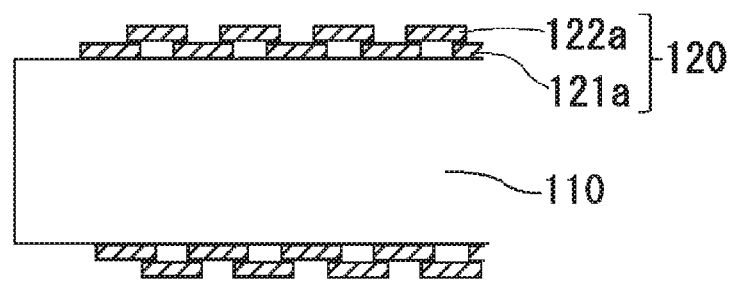
FIG. 2A to FIG. 2C show cross-sectional views of examples of a long body of the present invention.
Figure 2B:
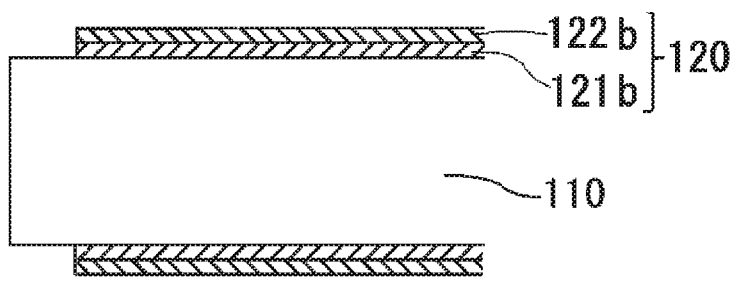
Figure 2C:
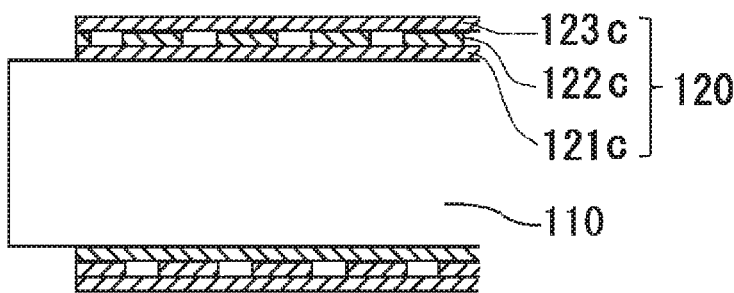

FIG. 2A to FIG. 2C show diagrams showing a part of a cross section along the longitudinal direction of examples in which the long body of the present invention is formed by spirally winding a film. FIG. 2A to FIG. 2C show examples in which the long body 120 includes at least two layers. FIG. 2A is a diagram when the long body 120 includes two layers, and a first layer film 121a is spirally wound around the outer periphery of the mandrel 110 at intervals. A second layer film 122a is spirally wound around the outer side than the first layer film 121a so as to fill the intervals of the first layer film 121a. Accordingly, the outer peripheral surface of the mandrel 110 is completely covered with the two layers of films. FIG. 2B is a diagram showing another example in which the long body 120 includes two layers. A first layer film 121b is spirally wound around the mandrel 110 without a gap, and a second layer film 122b is spirally wound around the outer side than the first layer film 121b without a gap. FIG. 2C is a diagram showing an example in which the long body 120 includes three layers. A first layer film 121c is spirally wound around the outer periphery of the mandrel 110 without a gap, a second layer film 122c is spirally wound around the outer side than the first layer film 121c at intervals, and a third layer film 123c is spirally wound around the outer side than the second layer film 122c without a gap. The long body of the present invention may include, for example, four or more layers.

In the mandrel for use in the present invention, metal pipes made of SUS, copper, silver, brass, aluminum or nickel titanium, resin pipes made of PTFE or PEEK, metal wires made of SUS, copper, silver, aluminum or nickel titanium, wires made by plating metals such as silver or nickel on these metal wires, or resin wires made of PTFE or polyether ether ketone (PEEK), can be used. The cross-sectional shape of the mandrel is generally circular (including substantially circular), and may also be square, polygonal or the like, or the shape may be partially changed, if necessary. Since the long body comes into contact with the outer peripheral surface of the mandrel, the mandrel preferably has a smooth surface.

When a mandrel having a circular cross-sectional shape is used in the present invention, it is preferable to use a mandrel having an outer diameter of 0.05 mm or more and 10 mm or less, and among these, more preferably 0.075 mm or more and 8 mm or less, more preferably 0.1 mm or more and 5 mm or less. The tensile elongation at break of the mandrel is preferably 5% or more. In a case where the tensile elongation at break is 5% or more, when the mandrel is not needed in the production process, the mandrel can be stretched in the longitudinal direction to reduce the outer diameter thereof, and the finished product using the semi-worked product can be extracted from the mandrel more easily. In addition, the tensile strength at break is preferably 75 MPa to 600 MPa.

The film made of polytetrafluoroethylene for use in the long body of the present invention is preferably made of a PTFE having a solid structure. In the case of using the PTFE having a solid structure, the airtightness and strength of the finished product using the long body can be obtained. The film made of the PTFE having a solid structure can be produced, for example, as follows. Fine powders of a PTFE resin and an auxiliary agent (a lubricant such as solvent naphtha and white oil) are mixed and compressed, and the preliminarily formed product is charged into an extruder, formed into a film shape and is then dried. During the drying, the auxiliary agent in the formed product formed into a film shape is volatilized, and an unsintered PTFE film having pores in the film is obtained. When the unsintered PTFE film is heated to a temperature equal to or higher than the melting point and sintered, the pores in the film disappear and a solid PTFE film is obtained. At this time, the film can be further compressed through a pressure roll. The above unsintered PTFE film may be uniaxially or biaxially stretched while being heated at a temperature equal to or lower than the melting point to prepare a PTFE film having a porous structure, and then the PTFE film having a porous structure is pressed to form a film having a solid structure. The film after pressing may be used after firing. The prepared film is generally used by splitting to a width to be used. The above PTFE film having a porous structure can be changed from the PTFE having a porous structure to a PTFE having a solid structure by, for example, spirally winding around the outer periphery of the mandrel and then passing through a ring-shaped die.

The film for use in the long body of the present invention may contain a filler or other resins, if necessary. Examples of the filler include carbon, metal oxides such as alumina, and resin fillers. Examples of the other resins include thermoplastic fluororesins. These fillers or resins can be used alone or in combination of two or more thereof.

Figure 3:
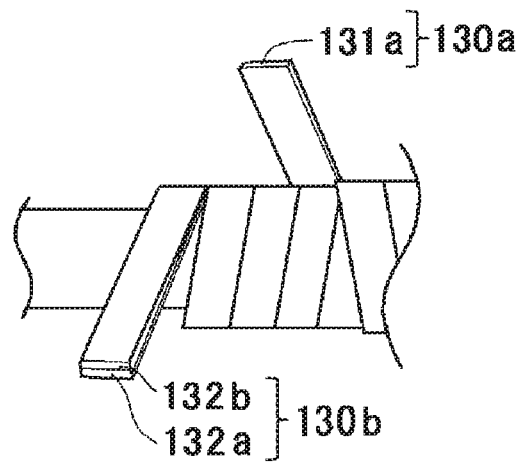
FIG. 3 is a diagram illustrating an example of a film for use in the long body of the present invention.

FIG. 3 is a diagram illustrating an example of the film for use in the long body of the present invention, which shows an example of the long body in which a second layer 130a includes one sheet of PTFE film 131a, and a first layer 130b is formed by laminating one sheet of PTFE film 132a and one sheet of thermoplastic fluororesin film 132b. The films for use in the long body of the present invention are not limited to the films formed by laminating two sheets of resin films such as 130b, and films formed by laminating a plurality of sheets such as three sheets or more of resin films can also be used. The plurality of sheets of resin films that were laminated may or may not be bonded to each other. In the present invention, the term "one sheet of film" also includes one in which two or more sheets of resin films are laminated and then wound around the mandrel (around a certain layer of the long body in some cases) at the same angle, such as in the second layer 130b in FIG. 3.

The resin for use in the resin film made of a thermoplastic fluororesin is preferably a resin having a melting point lower than the crystalline melting point of PTFE, such as a tetrafluoroethylene-hexafluoropropylene copolymer (FEP) and a tetrafluoroethylene-perfluoroalkyl vinyl ether copolymer (PFA). In the case of using one sheet of film including a PTFE film and a thermoplastic fluororesin film, the thickness ratio (PTFE resin film/thermoplastic fluororesin resin film) is preferably in the range of 10/1 to 1/1. The long body of the present invention preferably contains PTFE as a main component. Here, the term "main component" means a component occupying more than or equal to half of the whole in a volume ratio.

The film for use in the long body of the present invention preferably has a thickness of 2 μm or more and 25 μm or less, more preferably 3 μm or more and 25 μm or less, and still more preferably 3 μm or more and 20 μm or less. As the film becomes thinner, a step difference between the windings when winding the film around the mandrel is reduced, and the influence of the winding on the inner surface and the outer surface of the long body is reduced, which is preferred. However, when the film is too thin, the film may be broken or wrinkled when covering the mandrel with the film.

Figure 4:
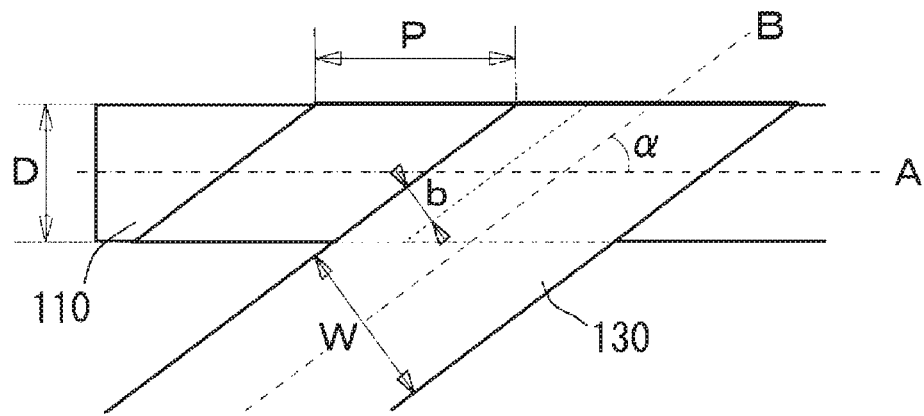
FIG. 4 is a diagram illustrating an example of a winding structure of the film of the long body of the present invention.

The width of the film for use in the long body of the present invention can be appropriately determined according to the inner diameter of the long body, the required thickness of the long body, the winding angle of the film, or the like. FIG. 4 is a diagram illustrating parameters relating to a winding structure of the film of the long body of the present invention. When the outer diameter of the mandrel 110 (inner diameter of the long body) is D, the winding angle of the film is a, the distance traveling when winding the film 130 for one round, that is, the pitch, is P, and the overlapping amount between the wound films 130 is b, the width W of the film 130 is obtained according to the following equations. Here, the winding angle α of the film is an angle sandwiched between a central axis A of the long body and a center line B of the width of the film and is larger than 0 degree and smaller than 90 degrees.

$P = \pi D \cos \alpha$ $W = P \sin \alpha + b$

In the present invention, the film winding number (number of wraps) is calculated according to the following equation. The width of the film 130 is set as W. and the overlapping amount between the films 130 is set as b.

Film winding number (number of wraps)=$1+(b/W)$

When the films 130 are wound at intervals, the overlapping amount between the films 130 is expressed as a negative amount, and the film winding number is a number less than 1.

Figure 5:
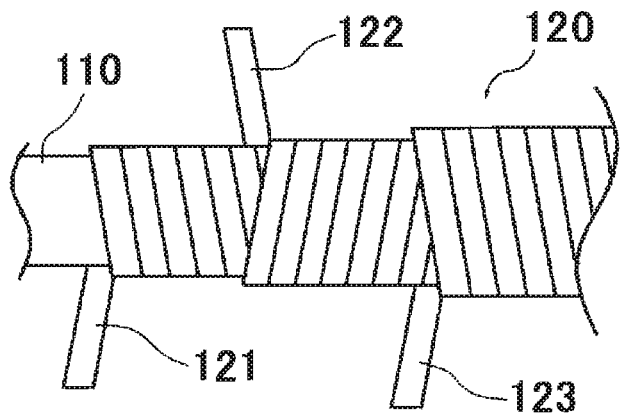
FIG. 5 is a diagram illustrating an example of a structure of the long body of the present invention.

FIG. 5 is a diagram illustrating an example of the winding structure of the film of the long body of the present invention. In the example shown in FIG. 5, three layers each including one sheet of film are provided. Each of the films is wound in either a right-handed (Z-wound) or left-handed (S-wound) spiral direction. In the example shown in FIG. 5, a first layer 121 of the long body 120 is formed by winding the film in a right-handed manner as a winding direction. A second layer 122 is formed by winding the film in a direction different from that of the first layer 121, that is, winding the film in a left-handed manner. A third layer 123 is formed by winding the film in the same direction as the first layer, that is, winding the film in a right-handed manner. In the long body of the present invention, it is preferable that one or more sheets of the films are spirally wound in a right-handed manner, and reversely, one or more sheets of the films are spirally wound in a left-handed manner.

Figure 6:
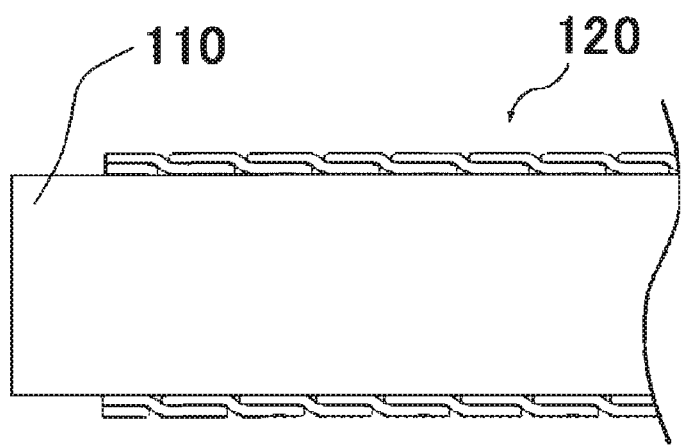
FIG. 6 is a cross-sectional view of an example of the long body of the present invention.

Each layer of the long body of the present invention is preferably wound at a film winding angle of 3 degrees to 30 degrees, and more preferably 3 degrees to 20 degrees. It is not necessary to make the winding angles of all layers constituting the long body uniform, and respective layers may be wound at different winding angles. The film of each layer of the long body is preferably wound such that ends of the films overlap with each other. Alternatively, a long body may be formed by laminating layers wound at intervals to completely cover the outer periphery of the mandrel. FIG. 6 shows an example in which the first layer film of the long body is wound with a winding number of 1.5 wraps (that is, the number of windings where half the width of the film overlaps with an adjacent film).

The long body on the mandrel is preferably heated to 340° C. or higher. By heating in this manner, overlapped portions of the wound films or the adjacent layers are fused and easily integrated. In addition, the heating makes it easier to strongly come into contact with the mandrel.

For the long body of the present invention, in a stress-strain curve of the long body where a measured value obtained by a tensile test according to JIS K7127-1999 is used, and a strain % is taken as a horizontal axis and a stress N/mm² is taken as a vertical axis, when the stress-strain curve is regarded as a single peak, a full width at half maximum of the peak is preferably in a range of 10% or more and 200% or less, more preferably in a range of 10% or more and 150% or less, and still more preferably in a range of 10% or more and 100% or less. Accordingly, a long body having a good balance of strength and flexibility is obtained. In addition, even a thin long body can have both flexibility and strength.

For the long body of the present invention, the 20% strain tensile strength of the long body obtained by the tensile test according to JIS K7127-1999 is particularly preferably 100 N/mm² or more.

If a product is not in the range of a finished product but in the range of a semi-worked product, a case where the long body of the present invention that further processing is applied on is provided to the manufacturer is also included in the present invention. At this time, the tensile test for the long body of the present invention is performed in the state of the long body alone before processing the long body.

Semi-worked products in the conventional art are provided according to the length of the finished product, and such a providing method may be good. However, in the method for providing a semi-worked product of the present invention, the long body can be provided in a length corresponding to a plurality of finished products by winding it on a reel or winding it in a bundle.

The method for producing a long body of the present invention will be described in more detail in the following Examples. The following Examples illustrate the present invention, and the contents of the present invention are not limited to the following Examples.

EXAMPLES

<Dimensional Measurement on Long Body>

The mandrel covered with the long body was cut to a length of about 1 m, only the mandrel was stretched and extracted, and the dimensions of the long body were measured. The inner diameter, the outer diameter, and the thickness are measured with a microscope on a cross section of the long body perpendicular to the longitudinal direction. Alternatively, a pin gauge is used for measuring the inner diameter, and the outer diameter is measured using a dial gauge with the pin gauge inserted thereto. In the case of using the microscope, the measurement is made in four or more directions in order to make the measurement as evenly as possible from respective directions within the same cross section, and an arithmetic mean value thereof is obtained. In the case of using the pin gauge and the dial gauge, the measurement is made as evenly as possible from four directions and an arithmetic mean value thereof is obtained. It is preferable to measure the cross section at a plurality of locations in the same sample as much as possible and obtain an arithmetic mean value. When the inner diameter of the long body is large, it is possible to cut the long body in the longitudinal direction and measure the thickness using a dial gauge.

It is preferable that the dimension of the long body is measured at a portion of the long body corresponding to substantially the center of the finished product in the longitudinal direction. For example, it is conceivable that when the portion of the long body corresponding to substantially the center of the finished product in the longitudinal direction is set as a center of the dimension measurement range, the dimension is measured within a range of 25 cm before and after the center of the dimension measurement range, and the arithmetic mean value thereof is obtained.

<Tensile Test>

A tensile test for the long body was performed according to JIS K7127-1999. Here, the test piece was along body cut into a length of about 8 cm to 10 cm or more. It is preferable that, for the test piece, the portion of the long body corresponding to substantially the center of the finished product in the longitudinal direction can be disposed at the center between the chucks. The test piece was set on the chuck of the tensile tester, and the tensile test was performed using a chunk distance as a distance between marked lines. Autograph AGS-1kNX, manufactured by Shimadzu Corporation, was used as the tensile tester, and the test was performed under the conditions including an environment of 23° C.±2° C., an initial chuck distance of 50 mm and a test speed of 200 mm/min.

Figure 7:
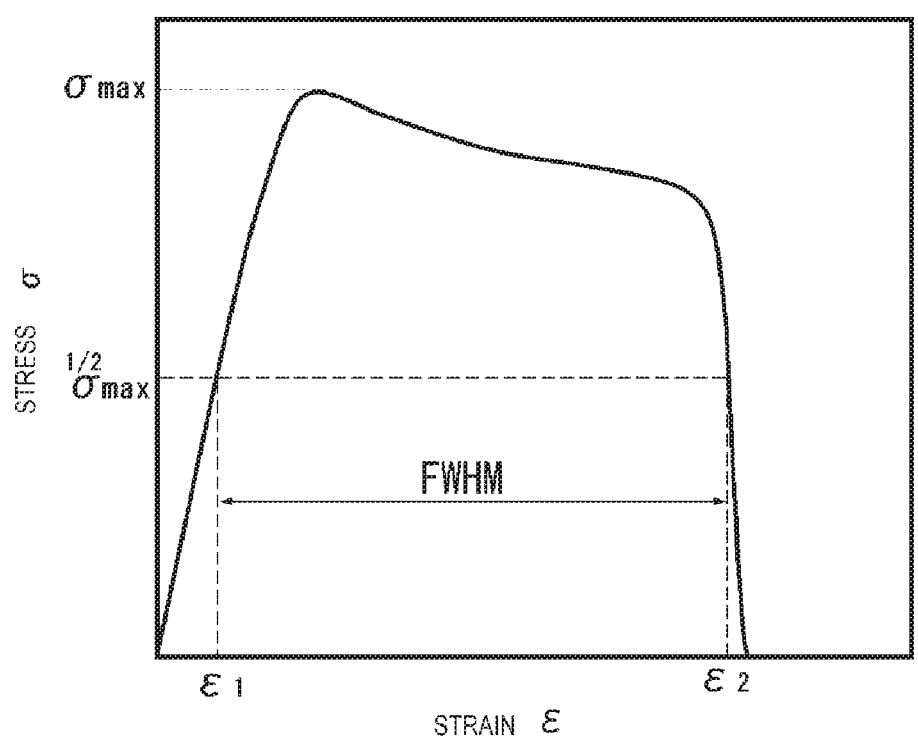
FIG. 7 is a schematic diagram of a stress-strain curve of the long body of the present invention.

The obtained measured values were used to create a stress-strain curve in which the horizontal axis represents strain in unit of % and the vertical axis represents stress in unit of N/mm². Here, the strain is a value obtained by dividing the increase in the distance between the marked lines during the tension by the initial chuck distance, and the stress is a value obtained by dividing the tensile force by the cross-sectional area of the long body before the tension between chucks (generally equal to the cross-sectional area of the end portion of the long body before the tension). The stress-strain curve was regarded as a single peak, and the width of the peak (difference between the two strain values of the peak) when a stress value is half the maximum stress value of the single peak was defined as the full width at half maximum of the peak in the stress-strain curve of the sample. FIG. 7 shows a schematic diagram of the stress-strain curve of the long body of the present invention and the full width at half maximum (FWHM) at this time. In a case where the stress-strain curve in FIG. 7 is regarded as a single peak, when the stress value is ½ σmax, which is half the maximum stress value σmax of the peak, the strain values are $\varepsilon_1$ and $\varepsilon_2$. The full width at half maximum of the peak is calculated according to the following equation.

Full width at half maximum (%)=$\varepsilon_2 - \varepsilon_1$

In the above tensile test, the tensile stress when the strain was 20% was defined as the 20% strain tensile strength. The 20% strain tensile strength is preferably 100 N/mm² or more.

Example 1

Steps of Manufacturer of Semi-Worked Product

As the film, a PTFE film (thickness 7 μm) was prepared. As the mandrel, a stainless steel wire having an outer diameter of 0.45 mm was prepared. By using a wrapper, a first layer of the PTFE film was spirally wound around the outer periphery of the mandrel in a right-handed manner with a winding number of 1.5 wraps, and then a second layer of the PTFE film was spirally wound around the first layer of PTFE film in a left-handed manner with a winding number of 1.3 wraps, so as to be stacked. The mandrel on which the films were stacked was passed through an oven heated to 370° C., then air-cooled and wound on a reel. The properties of the obtained long body were summarized in Table 1.

Steps of Manufacturer of Finished Product

The mandrel covered with the long body received from the manufacturer of the semi-worked product was fed from the reel to an extruder, a polyamide elastomer was extruded to the outer periphery of the said mandrel to a thickness of 0.25 mm, and it was cut to 2 min length with an in-line automated cutter. After cutting, only the mandrel was stretched to extract the mandrel, so as to obtain a finished product in which the polyamide elastomer was laminated.

Example 2

Steps of Manufacturer of Semi-Worked Product

As the film, a PTFE film (thickness 6 μm) was prepared. As the mandrel, a copper wire having an outer diameter of 0.19 mm was prepared. By using a wrapper, a first layer of the PTFE film was spirally wound around the outer periphery of the mandrel in a right-handed manner, and then a second layer of the PTFE film was spirally wound around the first layer of PTFE film in a left-handed manner with a winding number of 1.4 wraps, so as to be stacked. The mandrel on which the films were stacked was passed through an oven heated to 380° C., then air-cooled and wound on a reel. The properties of the obtained long body were summarized in Table 1.

Steps of Manufacturer of Finished Product

The mandrel covered with the long body received from the manufacturer of the semi-worked product was fed from the reel to an extruder, a polyamide elastomer was extruded to the outer periphery of the said mandrel to a thickness of 0.20 mm, and it was cut to 2 m in length with an in-line automated cutter. After cutting, only the mandrel was stretched to extract the mandrel, so as to obtain a finished product in which the polyamide elastomer was laminated.

Example 3

Steps of Manufacturer of Semi-Worked Product

As the film, a PTFE film (thickness 7 μm) was prepared. In addition, films (laminated films) obtained by laminating a PTFE film (thickness 7 μm) and a PFA film (thickness 8 μm) were prepared. As the mandrel, a stainless pipe having an outer diameter of 1.51 mm was prepared. By using a wrapper, a first layer of the PTFE film was spirally wound around the outer periphery of the mandrel in a left-handed manner with a winding number of 1.5 wraps, and then a second layer of the laminated films was spirally wound around the first layer of PTFE film in a right-handed manner with a winding number of 1.9 wraps, so as to be stacked. The mandrel on which the films were stacked was passed through an oven heated to 380° C., then air-cooled and wound on a reel. The properties of the obtained long body were summarized in Table 1.

Steps of Manufacturer of Finished Product

The mandrel covered with the long body received from the manufacturer of the semi-worked product was fed from the reel to an extruder, a polyamide elastomer was extruded to the outer periphery of the said mandrel to a thickness of 0.5 mm, and it was cut to 2 m in length with an in-line automated cutter. After cutting, only the mandrel was stretched to extract the mandrel, so as to obtain a finished product in which the polyamide elastomer was laminated.

Example 4

Steps of Manufacturer of Semi-Worked Product

Films (laminated films) obtained by laminating a PTFE film (thickness 6 μm) and a PFA film (thickness 2 μm) were prepared. As the mandrel, a PTFE monofilament having an outer diameter of 1.51 mm was prepared. By using a wrapper, a first layer of the laminated films was spirally wound around the outer periphery of the mandrel in a left-handed manner with a winding number of 1.5 wraps, with the PTFE side of the laminated films facing the mandrel, and then a second layer of the laminated films was spirally wound around the first layer of laminated films in a right-handed manner with a winding number of 1.5 wraps, so as to be stacked. The mandrel on which the films were stacked was passed through an oven heated to 370° C., then air-cooled and wound on a reel. The properties of the obtained long body were summarized in Table 1.

Steps of Manufacturer of Finished Product

The mandrel covered with the long body received from the manufacturer of the semi-worked product was fed from the reel to an extruder, a polyurethane elastomer was extruded to the outer periphery of the said mandrel to a thickness of 0.5 mm, and it was cut to 2 m in length with an in-line automated cutter. After cutting, only the mandrel was stretched to extract the mandrel, so as to obtain a finished product in which the polyurethane elastomer was laminated.

Example 5

Steps of Manufacturer of Semi-Worked Product

As the film, a PTFE film (thickness 6 μm) was prepared. In addition, films (laminated films) obtained by laminating a PTFE film (thickness 6 μm) and a PFA film (thickness 2 μm) were prepared. As the mandrel, a stainless pipe having an outer diameter of 1.49 mm was prepared. By using a wrapper, a first layer of the PTFE film was spirally wound around the outer periphery of the mandrel in a right-handed manner with a winding number of 1.3 wraps, then a second layer of the laminated films was spirally wound around the first layer of PTFE film in a left-handed manner with a winding number of 1.2 wraps, and then, a third layer of the laminated films was spirally wound around the second layer of laminated films in a left-handed manner with a winding number of 1.0 wraps, so as to be stacked. The mandrel on which the films were stacked was passed through an oven heated to 390° C., then air-cooled and wound on a reel. The properties of the obtained long body were summarized in Table 1.

Steps of Manufacturer of Finished Product

The mandrel covered with the long body received from the manufacturer of the semi-worked product was fed from the reel to an extruder, a polyurethane elastomer was extruded to the outer periphery of the said mandrel to a thickness of 0.5 mm, and it was cut to 2 m in length with an in-line automated cutter. After cutting, only the mandrel was stretched to extract the mandrel, so as to obtain a finished product in which the polyurethane elastomer was laminated.

Example 6

Steps of Manufacturer of Semi-Worked Product

As the film, a PTFE film (thickness 6 μm) was prepared. In addition, films (laminated films) obtained by laminating a PTFE film (thickness 7 μm) and a PFA film (thickness 8 μm) were prepared. As the mandrel, a stainless pipe having an outer diameter of 1.49 mm was prepared. By using a wrapper, a first layer of the PTFE film was spirally wound around the outer periphery of the mandrel in a left-handed manner with a winding number of 1.3 wraps, then a second layer of the laminated films was spirally wound around the first layer of PTFE film in a right-handed manner with a winding number of 1.9 wraps, and then a third layer of the laminated films was spirally wound around the second layer of laminated films in a left-handed manner with a winding number of 1.9 wraps, so as to be stacked. The mandrel on which the films were stacked was passed through an oven heated to 370° C., then air-cooled and wound on a reel. The properties of the obtained long body were summarized in Table 1.

Steps of Manufacturer of Finished Product

The mandrel covered with the long body received from the manufacturer of the semi-worked product was fed from the reel to an extruder, a polyolefin elastomer was extruded to the outer periphery of the said mandrel to a thickness of 0.5 mm, and it was cut to 2 m in length with an in-line automated cutter. After cutting, only the mandrel was stretched to extract the mandrel, so as to obtain a finished product in which the polyolefin elastomer was laminated.

Example 7

Steps of Manufacturer of Semi-Worked Product

Films (laminated films) obtained by laminating a PTFE film (thickness 8 μm) and a PFA film (thickness 7 μm) were prepared. As the mandrel, an aluminum wire having an outer diameter of 1.49 mm was prepared. By using a wrapper, a first layer of the laminated films was spirally wound around the outer periphery of the mandrel in a right-handed manner with a winding number of 1.3 wraps, and then a second layer of the laminated films was spirally wound around the first layer of laminated films in a left-handed manner with a winding number of 1.3 wraps, so as to be stacked. The mandrel on which the films were stacked was passed through an oven heated to 380° C., then air-cooled and wound on a reel. The properties of the obtained long body were summarized in Table 1.

Steps of Manufacturer of Finished Product

The mandrel covered with the long body received from the manufacturer of the semi-worked product was fed from the reel to an extruder, a polyolefin elastomer was extruded to the outer periphery of the said mandrel to a thickness of 0.5 mm, and it was cut to 2 min length with an in-line automated cutter. After cutting, only the mandrel was stretched to extract the mandrel, so as to obtain a finished product in which the polyolefin elastomer was laminated.

Example 8

Steps of Manufacturer of Semi-Worked Product

As the mandrel, a stainless steel wire having an outer diameter of 1.01 mm was prepared. Into a container, 18 parts by mass of an auxiliary agent was added to 100 parts by mass of PTFE fine powders, which were mixed, and the mixture was charged into a preliminary forming machine to prepare a preliminarily formed body. The preliminarily formed body was charged into an extrusion molding machine and extrusion-molded into a seamless film through a cylindrical extrusion mold. While being stretched, the seamless film was covered on the mandrel coming out through the inside of the extrusion mold to form a long body. The mandrel covered with the long body was dried in a drying oven set to 150° C., passed through a firing oven set to 430° C., then air-cooled and wound on a reel. The properties of the obtained long body were summarized in Table 1.

Steps of Manufacturer of Finished Product

The mandrel covered with the long body received from the manufacturer of the semi-worked product was fed from the reel to an extruder, a polyamide elastomer was extruded to the outer periphery of the said mandrel to a thickness of 0.35 mm, and it was cut to 2 m in length with an in-line automated cutter. After cutting, only the mandrel was stretched to extract the mandrel, so as to obtain a finished product in which the polyamide elastomer was laminated.

In the above Examples, the manufacturer of the semi-worked product and the manufacturer of the finished product may be different entities, but they may be persons involved in different production processes within the same entity.

Further, the delivery may not be from the manufacturer of the semi-worked product to the manufacturer of the finished product but may be from the manufacturer of the semi-worked product to the manufacturer of the next semi-worked product.

Comparative Example 1

Steps of Manufacturer of Semi-Worked Product

To 100 parts by weight of PTFE fine powders, 15 parts by weight of an auxiliary agent was mixed, and the mixture was charged into a preliminary forming machine to prepare a preliminarily formed body. The preliminarily formed body was charged into the extrusion molding machine and extrusion-molded at a ram speed of 3 mm/min to have a cylindrical shape. The molded PTFE was dried, heated in an oven at 430° C., sintered and cut to obtain PTFE liners each having a thickness of 0.025 mm and a length of 2 m.

Steps of Manufacturer of Finished Product

As the mandrel, a stainless pipe having an outer diameter of 1.35 mm was prepared. A 2.2 m long mandrel was inserted into each of the PTFE liners received from the manufacturer of the semi-worked product. One end of the PTFE liner was fixed to the mandrel, a weight was fixed to the other end of the PTFE liner, the PTFE liner was hung in a constant temperature bath at 200° C., and the PTFE liner was stretched in the longitudinal direction by the load of the weight to reduce the diameter. A PTFE liner in which the inner surface of the PTFE liner was in contact with the surface of the mandrel was obtained.

Next, the mandrels covered with the PTFE liners were taken out one by one, a polyamide elastomer was coated to the surface of the said mandrel so as to be a thickness of 0.5 mm, and the polyamide elastomer was crosslinked. Thereafter, only the mandrel was stretched to extract the mandrel, so as to obtain a finished product in which the polyamide elastomer was laminated.

However, in the process of heating and stretching the PTFE liner in the longitudinal direction, all were stretched under the same conditions, but there were some that stretched too much in the longitudinal direction, and there were variations in the thickness of the PTFE liner.

The tensile test was performed on the long bodies prepared in the steps of the manufacturer of the semi-worked product of Examples and Comparative Examples according to JS K7127-1999. The tensile test was performed under the conditions of a chuck distance of 50 mm and a test speed of 200 mm/min. From the obtained measured values, the full width at half maximum of the peak in the stress-strain curve of the sample and the 20% strain tensile strength were confirmed. The results are shown in Table 1.

TABLE 1

|  |  | Example 1 | Example 2 | Example 3 | Example 4 | Example 5 | Example 6 | Example 7 | Example 8 | Comparative Example 1 |
|---|---|---|---|---|---|---|---|---|---|---|
| Inner diameter of long body | mm | 0.45 | 0.19 | 1.51 | 1.51 | 1.49 | 1.49 | 1.49 | 1.01 | 1.5 |
| Thickness of long body | mm | 0.015 | 0.013 | 0.025 | 0.012 | 0.021 | 0.036 | 0.040 | 0.010 | 0.025 |
| Full width at half maximum of peak in stress-strain curve | % | 41.8 | 22.0 | 56.0 | 63.3 | 58.7 | 61.3 | 118.7 | 146.7 | 362.7 |
| 20% strain tensile strength | N/mm$^2$ | 120.7 | 152.0 | 132.4 | 269.4 | 426.3 | 152.4 | 173.7 | 100.2 | 94.0 |

The long body provided as the semi-worked product by the providing method of the present invention can greatly reduce the steps of the manufacturer of the finished product since it is not necessary for the manufacturer of the finished product to perform a step of covering the mandrel. In Comparative Example which is a providing method in the conventional art, a step of covering the mandrel with the long body is required, so that the working time is largely lost as compared with Examples which are the providing method of the present invention. Moreover, in Comparative Example which is a providing method in the conventional art, it is necessary to individually produce a plurality of finished products.

INDUSTRIAL APPLICABILITY

The semi-worked product of the present invention can be preferably used in a wide range of fields such as an inner layer material of a fluid transportation pipe which require chemical resistance and medical applications such as a catheter. For a manufacturer who is provided with and handles the semi-worked product of the present invention, the production time in the production process can be greatly reduced.

REFERENCE SIGNS LIST

110 Mandrel
120 Long body
121 First layer
122 Second layer
123 Third layer
130 Film

The invention claimed is:

1. A method for providing a semi-worked product, wherein
the semi-worked product is a long body which is formed without a gap by spirally winding at least one sheet of film,
at least one sheet of film of the at least one sheet of film is made of at least polytetrafluoroethylene,
the long body has an average thickness of 5 μm or more and 75 μm or less,
the long body is provided in a state that the at least one sheet of spirally wound film in the long body is in contact with a mandrel, and
in a stress-strain curve of the long body where a measured value obtained by a tensile test according to JIS K7127-1999 is used, and a strain% is taken as a horizontal axis and a stress $N/mm^2$ is taken as a vertical axis, when the stress-strain curve is regarded as a single peak, a full width at half maximum of the peak is in a range of 10% or more and 150% or less.

2. The method for providing a semi-worked product according to claim 1, wherein a 20% strain tensile strength of the long body obtained by the tensile test according to JIS K7127-1999 is 100 $N/mm^2$ or more.

3. The method for providing a semi-worked product according to claim 1, wherein in the long body, one or more sheets of the films are spirally wound in a right-handed manner, and one or more sheets of the films are spirally wound in a left-handed manner.

4. The method for providing a semi-worked product according to claim 1, wherein the film has a thickness of 2 μm or more and 25 μm or less.

5. The method for providing a semi-worked product according to claim 1, wherein one or more sheets of the films are formed by laminating at least a polytetrafluoroethylene film and a thermoplastic fluororesin film.

6. The method for providing a semi-worked product according to claim 1, wherein the mandrel has an outer diameter of 0.05 mm or more and 10 mm or less.

7. A method for providing a semi-worked product, wherein the semi-worked product is a cylindrical long body made of at least polytetrafluoroethylene,
the long body has an average thickness of 5 μm or more and 75 μm or less,
in a stress-strain curve of the long body where a measured value obtained by a tensile test according to JIS K7127-1999 is used, and a strain% is taken as a horizontal axis and a stress $N/mm^2$ is taken as a vertical axis,
when the stress-strain curve is regarded as a single peak, a full width at half maximum of the peak is in a range of 10% or more and 150% or less, and
the long body is provided in a state of being in contact with a mandrel.

8. A method for providing a semi-worked product, wherein
the semi-worked product is a cylindrical long body made of at least polytetrafluoroethylene,
the long body has an average thickness of 5 μm or more and 75 μm or less,
in a stress-strain curve of the long body where a measured value obtained by a tensile test according to JIS K7127-1999 is used, and a strain% is taken as a horizontal axis and a stress $N/mm^2$ is taken as a vertical axis,
when the stress-strain curve is regarded as a single peak, a full width at half maximum of the peak is in a range of 10% or more and 200% or less, and
the long body is provided in a state of being in contact with a mandrel.

* * * * *